United States Patent [19]

Junior et al.

[11] Patent Number: 5,113,650
[45] Date of Patent: May 19, 1992

[54] REORIENTING GRAIN DIRECTION OF CALENDERED INSULATION SHEET STOCK PERPENDICULAR TO GAS FLOW IN SOLID PROPELLANT ROCKET MOTORS

[75] Inventors: Kenneth E. Junior, Madison; James D. Byrd, Huntsville, both of Ala.

[73] Assignee: Thiokol Corporation, Ogden, Utah

[21] Appl. No.: 408,233

[22] Filed: Sep. 18, 1989

[51] Int. Cl.$^5$ .............................. F02K 9/32
[52] U.S. Cl. ...................... 60/253; 60/271; 428/181
[58] Field of Search ............ 60/253, 255, 271; 264/286, 339; 428/181

[56] References Cited

U.S. PATENT DOCUMENTS

| | | | |
|---|---|---|---|
| 3,250,070 | 5/1966 | Milewski et al. | 60/271 |
| 3,347,047 | 10/1967 | Hartz et al. | 60/253 |
| 3,421,970 | 1/1969 | Daly et al. | 161/170 |
| 4,492,779 | 1/1985 | Junior et al. | 523/138 |
| 4,600,732 | 7/1986 | Junior et al. | 523/138 |

FOREIGN PATENT DOCUMENTS

| | | | |
|---|---|---|---|
| 6151524 | 11/1981 | Japan | 264/286 |
| 1313722 | 11/1985 | U.S.S.R. | 264/286 |
| 1423393 | 9/1988 | U.S.S.R. | 264/286 |

*Primary Examiner*—Louis J. Casaregola
*Attorney, Agent, or Firm*—Madson & Metcalf

[57] ABSTRACT

Improved resistance of fiber filled insulation to erosion from combustion gas flow in a solid propellant rocket motor is produced by orienting the fiber direction of the grain of the fibers in the insulation to a direction in which the direction of the fiber grain is substantially perpendicular to the direction of the flow of combustion gas in the rocket motor. Unvulcanized fiber filled insulation sheet stock is folded and compacted in accordion-like style such that the fiber grain direction is reoriented eassentially 90 degrees in the roll direction of the sheet stock.

10 Claims, 3 Drawing Sheets

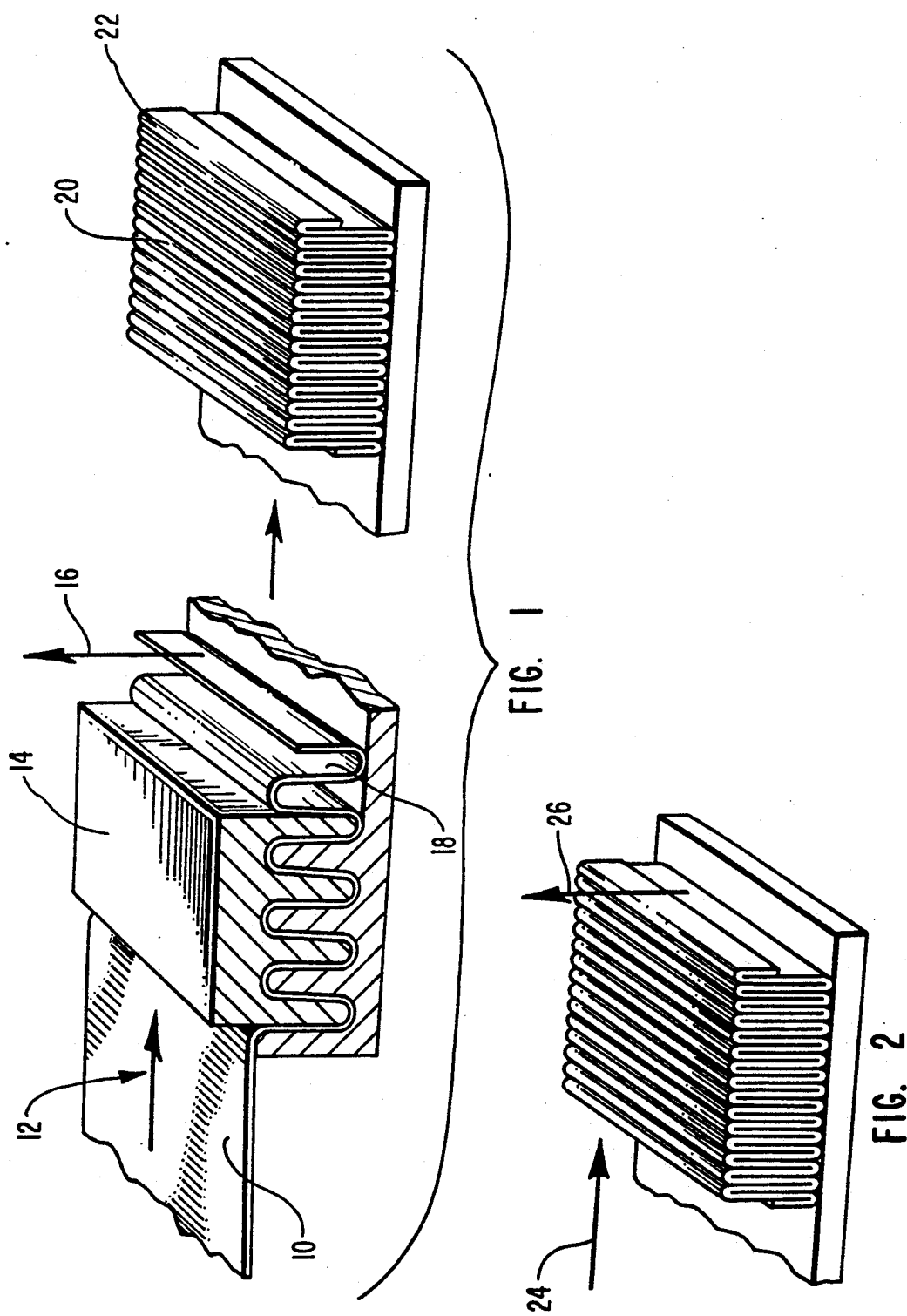

REORIENTING GRAIN DIRECTION OF CALENDERED INSULATION SHEET STOCK PERPENDICULAR TO GAS FLOW IN SOLID PROPELLANT ROCKET MOTORS

FIELD OF THE INVENTION

This invention relates to a process and product for increasing the erosion resistance of elastomeric insulation in a solid propellant rocket motor and more particularly to a method of increasing the erosion resistance of elastomeric insulation in a solid propellant rocket motor by orienting the direction of the fiber grain such that the fiber grain is substantially perpendicular to the direction of the flow combustion gas in the rocket motor.

BACKGROUND TO THE INVENTION

The combustion of a solid rocket propellant charge creates a hostile environment characterized by extremely high temperature, pressure and turbulence in the interior of the rocket motor. Temperatures typically exceed 5,000° F. (2760° C.). (1.02×10$^5$ g/cm$^2$). Chamber gas velocity typically may reach Mach 0.2 (about 154 miles per hour or 67 meters per second at 20° C.) at the aft end of the rocket motor. This environment is considered particularly hostile in a solid rocket motor because the combustion gas typically contains dispersed particles consisting essentially of aluminum oxide liquid droplets. These suspended droplets are believed to produce erosion of the rocket motor case insulation by abrading the interior of the rocket motor case by a sandblasting type effect. While the combustion of rocket propellant is usually of short duration, the conditions described above can destroy unprotected rocket motor casings prematurely and jeopardize the mission of the rocket.

Those parts of the rocket structure which are exposed to the high temperatures, pressures, and erosive flow conditions generated by the burning propellant are usually protected by applying a lining of insulation. Various materials, both filled and unfilled, have been tried as insulation. These include phenolic resins, epoxy resins, high temperature melamine-formaldehyde coatings, ceramics, polyester resins and the like. These materials, when cured, usually become rigid structures which crack or blister when exposed to the rapid temperature and pressure changes occurring when the propellant is burned. Some rubber-like elastomeric systems have been tried as insulation. These systems are ablative insulation because the elastomer is sacrificed or consumed during combustion, but nevertheless provides some protection for the rocket chamber. Such materials are capable of enduring in a rocket motor long enough to allow complete combustion of the solid propellant.

The best rocket insulation materials previously known to the art are elastomeric polymers reinforced with asbestos. Such systems are capable of enduring for a time sufficient to allow complete combustion of the propellant. Asbestos-reinforced elastomeric insulation systems are the subject of U.S. Pat. No. 3,421,970 to Daley et al., issued Jan. 14, 1969, and U.S. Pat. No. 3,347,047, to Hartz et al., issued Oct. 17, 1967. Those patents are hereby incorporated herein by reference.

Environmental and health concerns have led manufacturers to seek an acceptable replacement for the asbestos in rocket motor case insulation. One alternative elastomeric insulation contains aramid polymer fibers in combination with a powder filler. That insulation is disclosed in U.S. Pat. No. 4,492,779, and assigned to the owner of the present invention. Another alternative is elastomeric insulation which contains polybenzimidazole (PBI) polymer fibers in combination with the powder filler. That insulation is disclosed in U.S. Pat. No. 4,600,732 and assigned to the owner of the present invention. Both of said patents are incorporated herein by reference. The polyaramid fiber reinforced materials however, have been found less erosion resistant than asbestos reinforced materials.

It is therefore desirable that a means be found to increase the erosion resistance of fiber filled elastomeric insulation used in solid propellant rocket motors. It is also desirable that an improved means be provided to protect the interior of a solid propellant rocket motor during combustion of the propellant.

BRIEF DESCRIPTION OF THE DRAWINGS

The invention will be explained and understood by reference to the drawings wherein:

FIG. 1 is a perspective view, partially in section, illustrating a method for reorienting the fiber grain direction of calendered unvulcanized insulation sheet stock;

FIG. 2 is a perspective view of the product produced in the method of FIG. 1 illustrating the direction of gas flow with respect to the fiber orientation;

SUMMARY OF THE INVENTION

Figure 3:
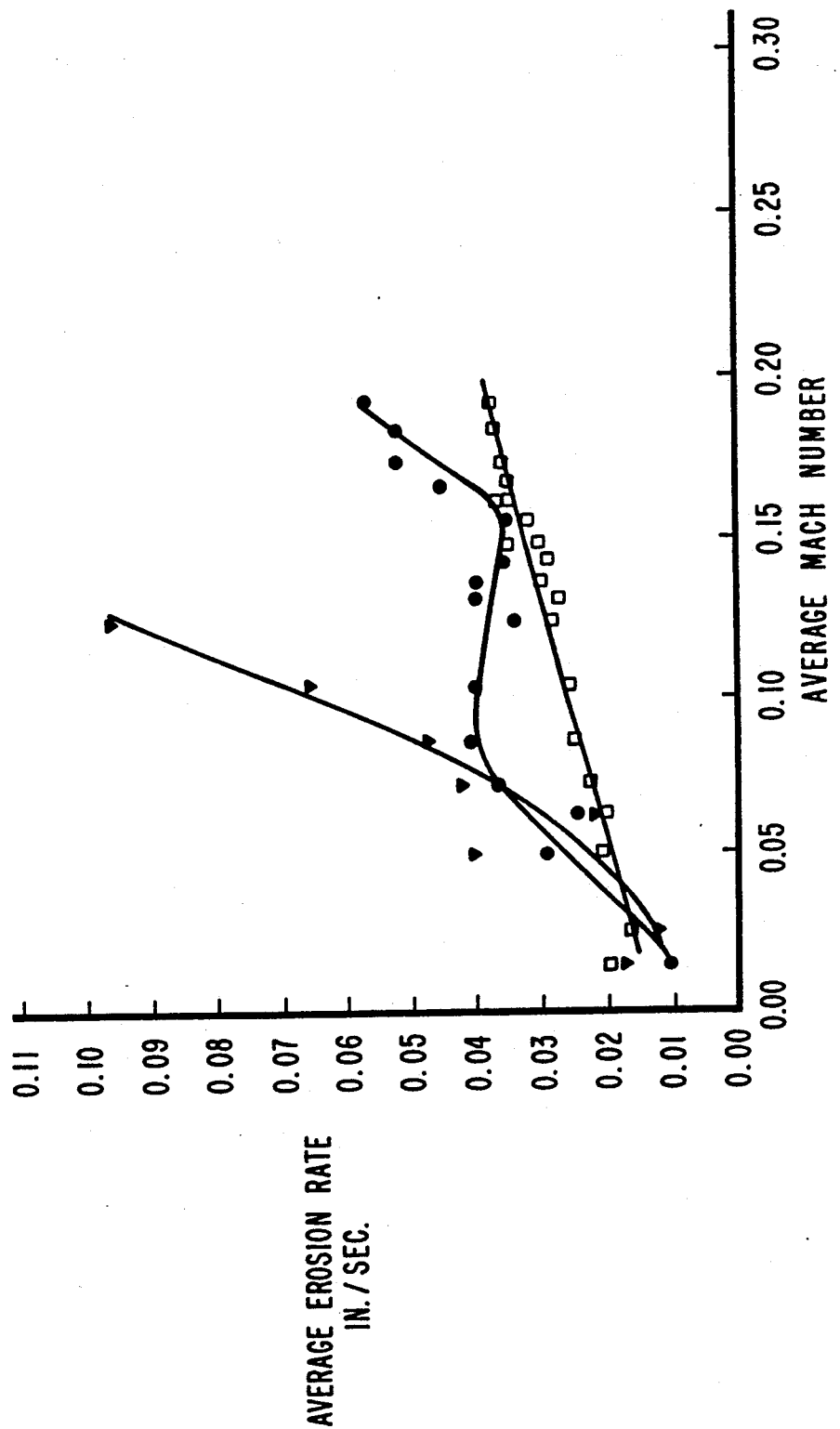
FIG. 3 is a plot of average erosion rate of fiber insulation versus Mach number (gas velocity) for the reoriented fibers insulation of this invention and for comparison purposes for unreoriented fiber insulation with the gas flow being with or across the grain of the unreoriented fiber direction.

The erosion resistance of fiber filled elastomeric insulation material used in solid propellant rocket motors is increased by orienting the fiber in the fiber filled insulation such that the fiber is perpendicular to the gas flow when installed in a solid propellant rocket motor. That is, the grain direction of fiber filled calendered insulation sheet stock is reoriented essentially 90 degrees with respect to the roll direction such that the fiber direction is oriented perpendicular to the gas flow when installed in a solid propellant rocket motor and this fiber reorientation dramatically improves the insulation performance with respect to erosion thereof from combustion gas flow in the rocket motor.

The reorientation of the fiber with respect to the roll direction is accomplished by folding and compacting the calendered unvulcanized insulation sheet stock (in the roll direction) in an accordion-like style and the folded, compacted calendered sheet stock material may then be vulcanized in a mold to obtain the cured insulation formed into the desired shape for use in a solid propellant rocket motor.

DETAILED DESCRIPTION OF THE INVENTION

In accordance with this invention, the erosion rate of insulation in a solid propellant rocket motor is substantially reduced by employing in the rocket motor insulation in which the insulation fiber direction is oriented in a direction perpendicular to the combustion gas flow in the rocket motor. The reoriented insulation fiber direction is obtained by a process in which calendered insulation sheet stock is folded or crimped in accordion-like style and then compacted to obtain the desired thickness of folded or crimped insulation for vulcanizing in a mold to form the desired insulation for the rocket motor. The folding or crimping of the unvulcanized insulation sheet stock can be accomplished by any suitable method, for example, either by hand or with folding or crimping apparatus suitable for said purpose.

The method of this invention is illustrated in FIG. 1. A sheet stock of unvulcanized or uncured insulation sheet stock 10 (obtained from a suitable insulation formulation calendered into sheet stock in appropriate calendering apparatus or rolls, not shown) having its fiber grain orientation in the roll direction, as indicated by directional arrow 12, is fed to crimping or folding apparatus 14 where the fiber grain of the insulation is reoriented to a direction perpendicular to the roll direction as indicated by directional arrow 16 by the sheet material being folded accordion-like style 18 in the folding or crimping apparatus. The folded sheet roll is compacted into an insulation stock 20 of the desired thickness for vulcanizing or curing in a mold to obtain the desired rocket motor insulation.

One advantage of the method of the invention is that any length of folded insulation sheet stock can be obtained with a variable thickness, if desired. The folded sheet stock can be folded to any suitable height but is generally folded in 0.25 inch to 0.5 inch (6.35 to 12.7 mm) high folds. A minor portion of the folded insulation 20 has the fibers still running in the roll direction (at the crown 22) which detracts from its erosion rate performance. However, this can be minimized by using thin gage sheet stock material of less than about 0.030 inch (0.762 mm) thick.

The orientation of the fiber direction with respect to the direction of gas flow in a rocket motor is illustrated in FIG. 2 where directional arrow 24 indicated the direction of gas flow and directional arrow 26 indicates the insulation fiber orientation which is perpendicular to the gas flow.

The insulation sheet stock may be formed from any suitable vulcanizable or curable elastomeric formulation comprising a vulcanizable elastomer, a fiber and suitable vulcanizing agents. The term vulcanizable elastomer as used herein means any rubber-like substance having some degree of flexibility in the cured, vulcanized, or heat and pressure-converted state. Examples of suitable vulcanizable elastomers are natural rubbers, butyl rubbers, butadiene-styrene copolymer rubbers, nitrile rubbers, neoprene rubbers, polyurethane rubbers, polybutadiene rubbers, polyisoprene rubbers, silicone rubbers, chlorosulfonated polyethylene rubbers, polyacrylonitrile rubbers, ethylene-propylene diene monomer rubbers, as well as various mixtures (including copolymers) of these rubbers. The preferred vulcanizable elastomer is a polyisoprene rubber commercially available as NATSYN 2200 from Goodyear Tire and Rubber Company, Akron, Ohio.

The fiber may be any suitable fiber useful for forming such rocket motor insulation sheet stock material. The following are examples of fibers contemplated for use herein, polybenzimidazole fiber, polyaramid fiber or pulp, phenolic fiber, carbon fiber, alumina fiber, asbestos, mineral wool, glass, nylon fiber, silica fiber, cotton flock, sisal, other natural fibers, or mixtures thereof. A preferred fiber is polybenzimidazole fiber.

A wide variety of optional ingredients are contemplated for use in the present elastomeric insulation compositions. Process aids, plasticizers, tackifiers, antioxidants, dispersing aids, pigments, fire retardants, and the like, can be incorporated, if desired, in sheet stock of the present formulations.

By vulcanizing agents are meant materials reacted with uncured vulcanizable elastomers to cross-link them, thereby effecting a cure. Preferred vulcanizing agents for use herein are zinc oxide, elemental sulfur, or mixtures of those agents.

The vulcanizable elastomeric compositions may optionally include cure accelerators such as polyethylene glycol, commercially available as CARBOWAX 4000 from Union Carbide Corporation, Danbury, Conn.; tetramethylthiuram monosulfide, commercially available as MONEX from Uniroyal Chemical, Naugatuck, Conn.; N-tert-butyl-2-benzothiazole-sulfenamide, commercially available as SANTOCURE NS from Monsanto Industrial Chemicals Company, St. Louis, MO.; mixtures thereof; or other materials known to be useful for accelerating the curing process. Catalyst release agents such as stearic acid also may have utility in the present compositions.

Still another optional ingredient is an antioxidant to improve the longevity of the cured composition. One antioxidant useful herein is a mixture of mono-, di-, and tristyrenated phenols, for example, the material known as AGERITE SPAR, available from the B. F. Goodrich Chemical Company, Cleveland, Ohio. Another antioxidant useful herein is diphenylamine reacted with acetone, commercially available as BLE-25 Liquid from Uniroyal Chemical Division, Naugatuck, Conn. ("CARBOWAX", "SANTOCURE", "MONEX", "AGERITE" and "BLE" are trademarks).

A powder filler is used as a secondary reinforcing agent, and also improves the physical properties of the fiber filled elastomer. In this way, high erosion resistance is provided without substantially sacrificing the mechanical properties of the elastomer. The term "powder filler" as used herein means a combustion resistant powdered material with a particle size range, expressed as specific surface area, of from about 1 meter$^2$/gram to about 200 meter$^2$/gram. Suitable powder fillers include silica, iron oxide, titanium oxide, milled glass, carbon, ceramic clay, and mixtures thereof. Silica powder is preferred because of its low cost and because of its relatively low absorption of the elastomer, which minimizes drying of the composition during mixing. The preferred particle size is at least 20 millimicrons. One material useful herein is HI-SIL EP, sold by PPG Industries, Inc., Pittsburgh, Pa. These optional ingredients are not critical and may be deleted or other materials may be substituted within the scope of the present invention.

A preferred composition using polyisoprene elastomer and polybenzimidazole fiber (PBI) is set forth hereinafter.

| Component | Parts by Weight |
| --- | --- |
| NATSYN 2200 | 100 |
| Zinc oxide | 5 |
| Stearic acid | 2 |
| AGERITE SPAR | 1.0 |
| BLE 25 | 0.5 |
| Sulfur | 2.5 |
| SANTOCURE NS | 1.5 |
| CARBOWAX 4000 | 3.0 |
| MONEX | 0.7 |
| HI-SIL EP | 45 |
| PBI Fibers 3" | 60 |

The insulation sheet stock starting material for use in the process of this invention can be produced from the above elastomeric formulation in a known way, such as, for example, by mixing the components of the formulation in a BANBURY mixer and forming the mixture into a sheet stock with suitable calendering rolls. The filler orientation in the calendered sheet stock will be in the roll direction. Such sheet stock is then utilizable as the starting sheet stock material 10 in FIG. 1. Sheet stock, preferably of about 0.030 inch (0.762 mm) thickness, is then folded or crimped in apparatus 14 reorienting the fiber essentially 90° to a direction perpendicular to the roll direction producing compacted insulation material 18.

Such folded insulation material may then be vulcanized in a suitable mold thereby forming insulation of the desired size and shape for use in a rocket motor.

Insulation from the aforesaid preferred formulation was formed into 0.030 inch (0.762 mm) thick sheet stock which was then folded accordion-like style into 0.25 inch (6.35 mm) high and compacted. The folded, compacted fiber direction-reoriented insulation material was vulcanized in a mold to form an insulation material for use in an erosion test. Similarly, identical 0.030 inch (0.762 mm) thick sheet stock in which the fiber direction was not reoriented, i.e. was not folded and compacted, was also formed into insulation by vulcanizing in a mold. This non-reoriented insulation material was simultaneously erosion tested in comparison with the reoriented insulation material in the manner described hereinafter.

Figure 4:
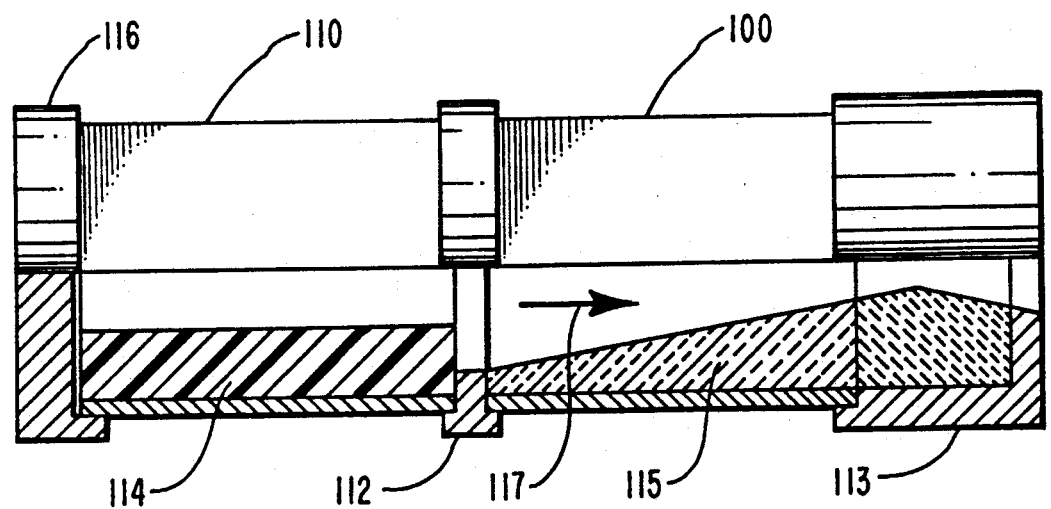
FIG. 4 is a longitudinal elevation of an insulation test motor, partially sectioned, illustrating a motor and method for testing the invention.
Figure 5:
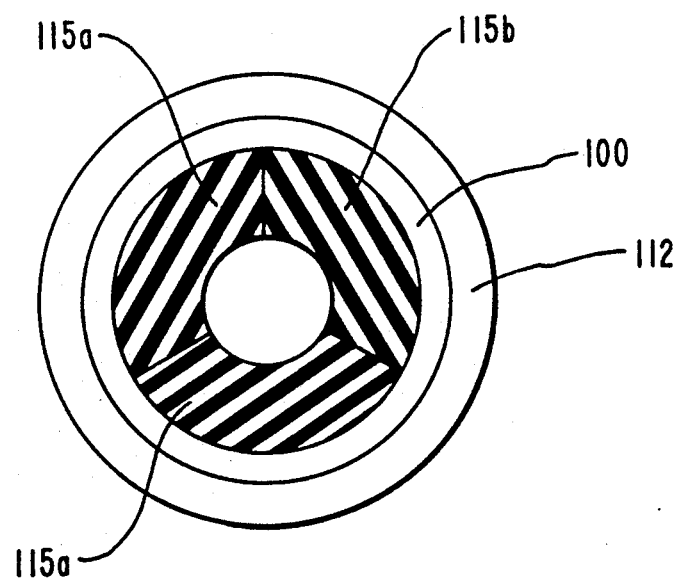
FIG. 5 is a cross-sectional view taken along line AA—AA of FIG. 4 showing the three sections of insulation being tested simultaneously.

FIGS. 4 and 5 illustrate the construction of a test motor employed for the static erosion testing of the insulation material. Referring to FIG. 4, the insulation test motor was composed of four sections: an insulated test section 100 joined on one end to rocket motor 110 by insulated coupler 112, and joined on the opposite end to nozzle extension 113. Rocket motor section 100 is closed by head end cap 116. Gas flow direction is indicated by direction arrow 117. The interior of the rocket motor contained center-perforated rocket propellant 114, which was ignited by conventional means (not shown). Insulated test section 100 was lined with rocket motor case insulation 115 to be tested. The rocket motor case insulation was uniformly tapered from a 0.5 inch (12.7 mm) thickness (at the edge of the insulated test section joined to the insulated coupler 112) to a maximum 2.5 inch (63.5 mm) thickness (at the opposite end of the insulated test section), thereby describing a nozzle of rocket motor case insulation having a minimum inside diameter of 1.0 inch (25.4 mm) where its slope reversed.

The motor is 6 inch (15.24 cm) diameter steel loaded with solid propellant with a 2 inch (5.08 cm) cylindrical bore. As shown in FIG. 5, the insulation is a steel case with three longitudinal erosion test insulation specimens 115a, 115b and 115c (of 120 circumference each) separated by aluminum spacers (not shown) and bonded into the case. The test specimens of insulation are tapered on the internal diameter to form a funnel or cone configuration. The cone shape increases the gas velocity generated by the propellant over the insulation up to the nozzle. In this way one can evaluate up to three insulation samples simultaneously under identical firing conditions over a Mach number (gas velocity) range. The motor operating pressure is determined by nozzle throat size. The motor is approximately 36 inches (91.44 cm) long and weighs approximately 150 pounds (68.04 kg). The solid propellant employed had the following formulation:

| Components | Weight % |
| --- | --- |
| Hydroxyl terminated polybutadiene polymer binder and dioctyl phthalate plasticizer | 11.90 |
| Ammonium perchlorate/aluminum powder and burning rate additive | 88.10 |

The burning time of the fifteen pounds of rocket propellant during static testing was typically about 5.0 seconds at flame temperatures of up to about 6000° F. (3316° C.). Average interior pressure was typically about 1375 psi ($9.19 \times 10^4$ g/cm$^2$). The velocity of the combustion gas varied, according to the thickness of the rocket motor case insulation, from approximately 0.015 Mach at the 0.5 inch (12.7 mm) thickness to approximately 0.250 Mach at the 0.75 inch (19.0 mm) thickness.

The static test accurately simulated the intended environment of the rocket motor case insulation because the insulation to be tested was exposed to heat, pressure, turbulence and suspended aluminum oxide droplets.

The insulation test sectors were premolded and bonded into the steel case test section. The inside surface of the three insulations are measured initially and tabulated as radial measurements as a function of distance from the forward end of the test section. The same procedure is repeated in the same longitudinal locations after motor firing. The amount of material (depth) lost during firing is calculated from these measurements. From these measurements, the gas velocity can be calculated for all locations before firing and after firing. The initial inside Mach number (gas velocity) is higher than the after firing Mach number. For purposes of data reduction, the average Mach number is used to plot an erosion rate vs average Mach number.

FIG. 3 plots the results of the static testing of the insulation sample of this invention (squares) with its fiber grain oriented perpendicular to the direction of the gas flow and the two comparison insulation samples, one oriented with its fiber grain aligned with the direction of the gas flow (triangles) and the other with its fiber grain oriented across the direction of the gas flow (circles). The insulation of this invention displays substantially improved erosion resistance (substantially less erosion) to gas flow than similar insulation material having its grain oriented either with or across the grain direction of the gas flow.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. A method of improving the resistance of fiber filled elastomeric insulation to erosion from combustion gas flow in a solid propellant rocket motor comprising orienting the fiber direction of the grain of the fibers in the elastomeric insulation to a direction in which the direction of the fiber grain is substantially perpendicular to the direction of the flow of combustion gas in the rocket motor.

2. A method according to claim 1 wherein the orienting of the fiber grain direction is accomplished by folding or crimping and compacting unvulcanized calendered fiber filled elastomeric insulation sheet stock in an accordion-like style such that the fiber grain direction is reoriented essentially 90 degrees so that the fiber direction is oriented essentially perpendicular to combustion gas flow in a rocket motor when molded into the shape or rocket motor insulation, vulcanized and installed as insulation in the rocket motor.

3. A method as claimed in claim 2 wherein the fiber filled insulation sheet stock has a thickness of about 0.030 inch (0.762 mm).

4. A method as claimed in claim 2 wherein the fiber filler insulation sheet stock is formed from a formulation comprising a polyisoprene elastomer and polybenzimidazole fibers.

5. A method as claimed in claim 3 wherein the fiber filler insulation sheet stock is formed from a formulation comprising a polyisoprene elastomer and polybenzimidazole fibers.

6. A solid propellant rocket motor having fiber filled insulation of improved resistance to erosion from combustion gas flow comprising a solid rocket motor having fiber filled elastomeric insulation therein wherein the fiber grain direction in the elastomeric insulation is oriented perpendicular to the direction of combustion gas flow in the rocket motor.

7. A solid propellant rocket motor having elastomeric insulation of improved resistance to erosion from combustion gas flow according to claim 6 wherein the elastomeric insulation has been molded into the shape of rocket motor insulation and vulcanized from calendered unvulcanized fiber filled elastomeric insulation sheet stock folded or crimped and compacted in accordion-like style such that fiber grain direction has been reoriented essentially 90 degrees so that the fiber direction is oriented essentially perpendicular to the direction of combustion gas flow in a rocket motor when the folded and compacted insulation is installed as insulation in the rocket motor.

8. A solid propellant rocket motor having insulation of improved resistance to erosion from combustion gas flow according to claim 7 wherein the fiber filled insulation sheet stock has a thickness of about 0.030 inch (0.762 mm).

9. A solid propellant rocket motor having insulation of improved resistance to erosion from combustion gas flow according to claim 7 wherein the fiber filled insulation sheet stock is formed from a formulation comprising a polyisoprene elastomer and polybenzimidazole fibers.

10. A solid propellant rocket motor having insulation of improved resistance to erosion from combustion gas flow according to claim 8 wherein the fiber filled insulation sheet stock is formed from a formulation comprising a polyisoprene elastomer and polybenzimidazole fibers.

* * * * *